United States Patent [19]

Tuttle

[11] Patent Number: 5,617,031

[45] Date of Patent: Apr. 1, 1997

[54] BURIED PIPE LOCATOR UTILIZING A CHANGE IN GROUND CAPACITANCE

[75] Inventor: John E. B. Tuttle, Falls Church, Va.

[73] Assignee: The United States of America as represented by the Secretary of the Army, Washington, D.C.

[21] Appl. No.: 658,903

[22] Filed: May 16, 1996

[51] Int. Cl.[6] .............................. G01V 3/08; G01V 3/10; G01R 19/00
[52] U.S. Cl. .................... 324/326; 324/329; 324/225; 324/243; 73/592; 73/594
[58] Field of Search ................................. 73/405 A, 592, 73/594, 596; 324/326, 329, 334, 207.16, 207.19, 207.26, 225, 243

[56] References Cited

U.S. PATENT DOCUMENTS

| | | | |
|---|---|---|---|
| 3,758,849 | 9/1973 | Susman et al. | 324/225 |
| 3,967,282 | 6/1976 | Young | 342/22 |
| 4,255,711 | 3/1981 | Thompson | 324/329 |
| 4,458,204 | 7/1984 | Weber | 324/326 |
| 4,600,356 | 7/1986 | Bridges et al. | 414/694 |
| 4,818,944 | 4/1989 | Rippingale | 324/326 |
| 5,194,812 | 3/1993 | Yokoi | 324/326 |

Primary Examiner—Hezron E. Williams
Assistant Examiner—Rose M. Miller
Attorney, Agent, or Firm—Freda L. Krosnick; Paul S. Clohan

[57] ABSTRACT

A buried pipe detection device based upon the principle of sensing of differences in the dielectric/conductive properties of the ground in the vicinity of the pipe is disclosed. Because the electrical properties of the ground directly over the buried pipe will differ from those of an area immediately adjacent to the pipe, the detection principle is embodied in a capacitor plate array that injects a low frequency sinusoidal signal into the ground and samples the injected signal from two spatially separated locations on the array. The capacitor plate array has two injector/sensor plates that form a capacitively coupled impedance bridge with the ground and a third plate to establish circuit ground. The injector/sensor plates sense changes in the ground path impedance directly beneath the plates as the array is moved along the ground. The outputs of the two sensor/injector plates are then combined differentially and are processed to provide a continuous analog or digital readout. As the capacitor plate array is moved along the ground, an operator observes the readout to detect and mark the location of the buried pipe. The operator, by pushing the instrumented capacitor plate array along the ground and observing the readout, may obtain a two dimensional map of the buried pipe.

5 Claims, 7 Drawing Sheets

5,617,031

BURIED PIPE LOCATOR UTILIZING A CHANGE IN GROUND CAPACITANCE

GOVERNMENTAL INTEREST

The invention described herein may be manufactured, used and licensed by or for the United States Government without payment to me of any royalty thereon.

TECHNICAL FIELD

The present invention relates to underground object detectors in general and specifically to a capacitive plate array detection device to locate buried pipes.

BACKGROUND ART

Many technologies have been used in the past for detection of underground objects such as pipes, power lines, gas lines, etc. These technologies include nuclear, acoustic, gravitational, magnetic and electromagnetic. Electromagnetic devices include infrared, microwave, low-frequency magnetic, and eddy currents. Both active and passive detection systems have been used. Nuclear systems have inherent safety disadvantages, and radar/acoustical, shortwave-longwave or electromagnetic induction systems also have their drawbacks. Sonic systems have the disadvantage of being dependent upon good soil contact.

A wide variety of metal detectors have also been used to locate buried "treasure", for geophysical exploration, for law enforcement purposes, etc. These types of detection devices generally operate to create a near field of continuous wave electromagnetic forces about a central inductive coil. When a metallic object is brought within the field, an impedance change occurs, resulting in the objects detection. These type of detectors are sensitive to variations in the soil giving rise to false signals. Many continuous electromagnetic wave type detectors are typically constructed having a transmit coil mutually coupled with a receive coil. The requirement of mutually coupled coils inhibits the use and application of these type of devices. Because the geometry of the coils are critical for operation, the device must be constructed of rigid members to maintain precise relative coil placement. These type devices are very sensitive to slight jarring or impact which may cause coil movement rendering the device inaccurate.

Efforts to improve detector sensitivity have also been directed to the use of pulsed eddy current detectors in which a pulsed magnetic field is directed toward a target and induces eddy currents in conductive targets. Voltages induced by the decay of the eddy currents are thus detected. In these devices, mutual coupling is not required between the transmit and receive coils.

STATEMENT OF THE INVENTION

It is therefore an object of the present invention to provide an inexpensive, operator-friendly instrumented sensor array apparatus to locate metal or non-metal buried pipes or other objects.

A further object of the present invention is to provide a method of locating buried metal or non-metal pipes and other objects that is inexpensive and operator-friendly. These and other objects are achieved by providing a buried pipe detection device based upon the principle of sensing of differences in the dielectric/conductive properties of the ground in the vicinity of the pipe. The electrical properties of the ground directly over the buried pipe will differ from those of an area immediately adjacent to the pipe. The detection principle is embodied in a capacitor plate array that injects a low frequency sinusoidal signal into the ground and samples the injected signal from two spatially separated locations on the array. The simplest embodiment of the capacitor plate array will have two antennas called injector/sensor plates that form a capacitively coupled impedance bridge with the ground and a third plate to establish circuit ground. The injector/sensor plates sense changes in the ground path impedance directly beneath the plates as the array is moved along the ground.

The outputs of the two sensor/injector plates are then combined differentially. The differentially combined sensor outputs are processed to provide a continuous analog or digital readout. As the capacitor plate array is moved along the ground, an operator observes the readout to detect and mark the location of the buried pipe. Maximum output will occur when one sensor plate is directly over the buried pipe, and minimum output will occur when the sensor plates straddle the pipe. The operator, by pushing the instrumented capacitor plate array along the ground and observing the readout, may obtain a two dimensional map of the buried pipe.

It is also possible to determine the burial depth of the pipe. Depth can be determined by knowing the frequency of the injected signal at which an output peak occurred and the ratio of maximum to minimum sensor output. Deep burial will be indicated by a relatively small maximum to minimum ratio combined with a relatively low frequency ($f \leq 300$ KHZ). Conversely a large maximum to minimum ratio occurring at a high frequency indicates shallow burial ($f \geq 350$ KHZ).

DETAILED DESCRIPTION OF THE PREFERRED EMBODIMENT

Figure 3:
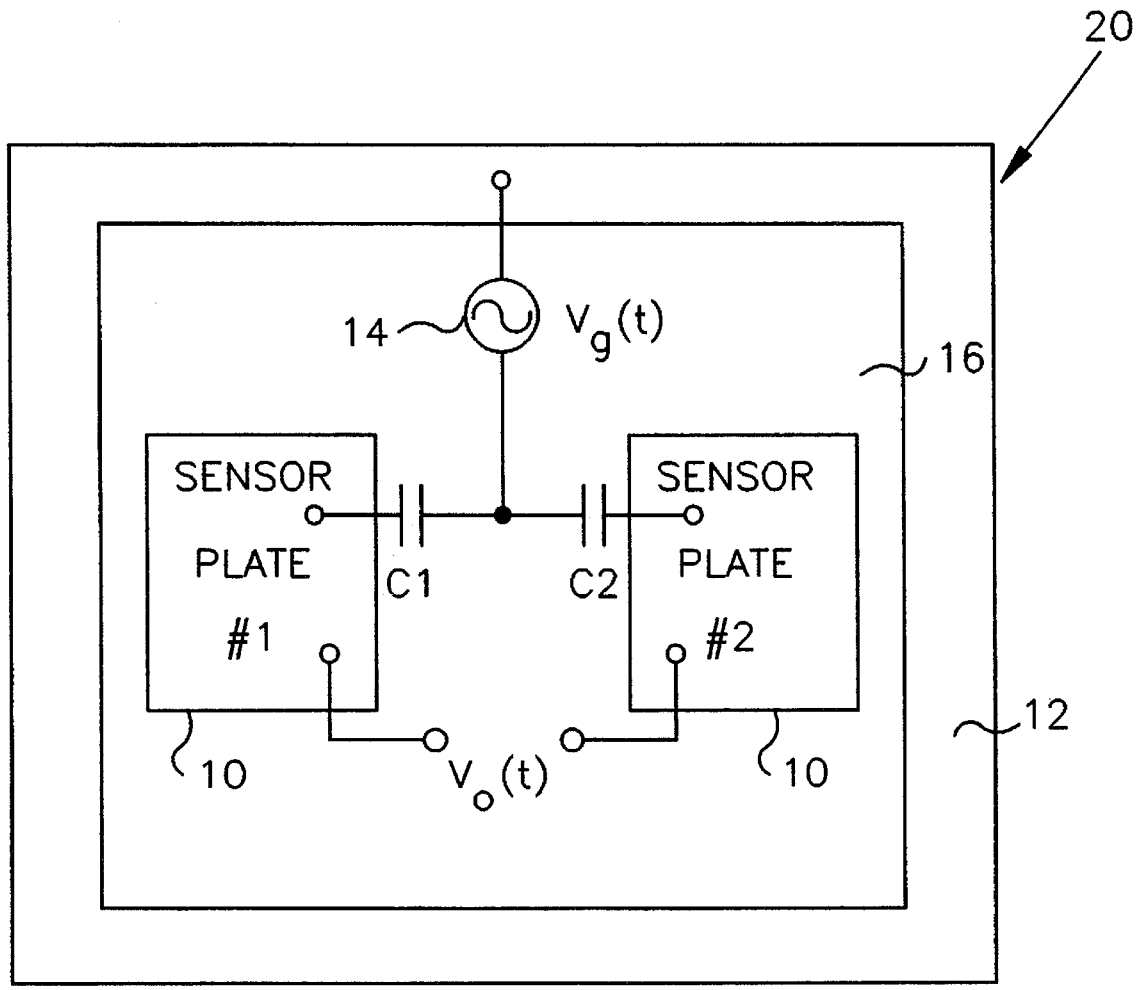
FIG. 3 shows a three plate capacitor array according to the teachings of the present invention.
Figure 4:
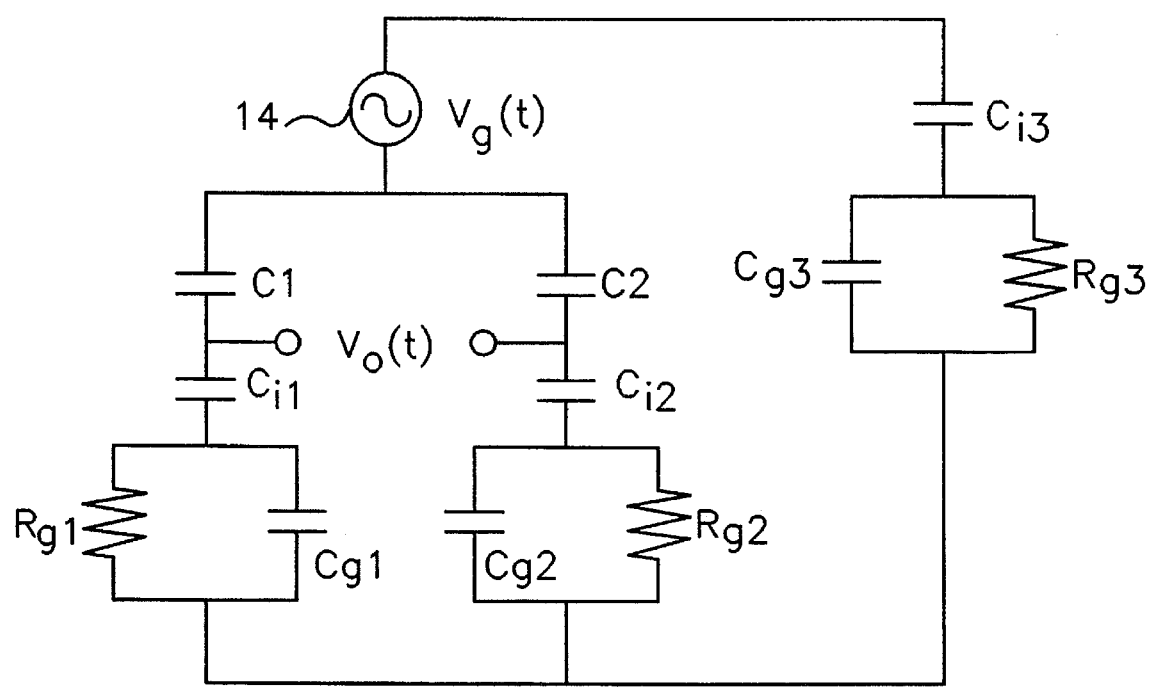
FIG. 4 shows the equivalent circuit formed by a three plate capacitor array placed on the ground.

Referring now in detail to the drawings wherein like parts are designated by like reference numerals throughout, there is illustrated in FIG. 3 a three-plate capacitor array 20 having two equal-area flat plate antennas 10 called injector/sensor plates, a flat conductive ground plate 12, and a flat insulator plate 16 between injector/sensor plates 10 and ground plate 12. Insulator plate 16 can be made from BAKELITE, masonite, or other suitable material, and injector/sensor plates 10 as well as ground plate 12 can be made from flexprint, which is a copper coated MYLAR. A low frequency sinusoidal signal generator 14 [$V_g(t)$] is grounded to plate 12 and coupled to injector/sensor plates 10 via two fixed value capacitors C1 and C2. When three-plate capacitor plate array 20 is placed on the ground, a capacitively coupled impedance bridge is formed. The equivalent circuit formed by three-plate capacitor array 20 when placed on the ground is shown in FIG. 4. In this circuit, $X_{ci3} \ll X_{ci1}$, $X_{ci3} \ll C_{ci2}$, $X_{cg3} \ll X_{cg1}$, $X_{cg3} \ll X_{cg2}$, $R_{g3} \ll R_{g1}$, and $R_{g3} \ll R_{g2}$. Each half bridge of the circuit shown in FIG. 4 contains four passive circuit elements as follows:

C1 or C2: Fixed value capacitors connected to injector/sensor plates 10.

$C_{i1}$ or $C_{i2}$: Interface capacitors formed by the injector/sensor plates 10 and ground plate 12.

$R_{g1}$ or $R_{g2}$: Ground resistance directly below the injector/sensor plates 10, which includes the effects of a buried pipe, if present.

$C_{g1}$ or $C_{g2}$: Ground capacitance below the injector/sensor plates 10 and may include effects of a buried pipe.

FIG. 4 also shows the equivalent circuit elements arising from the presence of ground plate 12:

$C_{i3}$: Interface capacitance formed by ground plate 12 and the surface of the ground.

$R_{g3}$: Ground resistance directly below ground plate 12.

$C_{g3}$: Ground capacitance directly below ground plate 12 in parallel with $R_{g3}$.

Since the surface area of ground plate 12 is much greater than that of injector/sensor plates 10, the impedances due to circuit elements $C_{i3}$, $R_{g3}$, and $C_{g3}$ are small and can be ignored. Thus the FIG. 4 equivalent circuit reduces to the simplified equivalent bridge circuit shown in FIG. 5.

Figure 5:
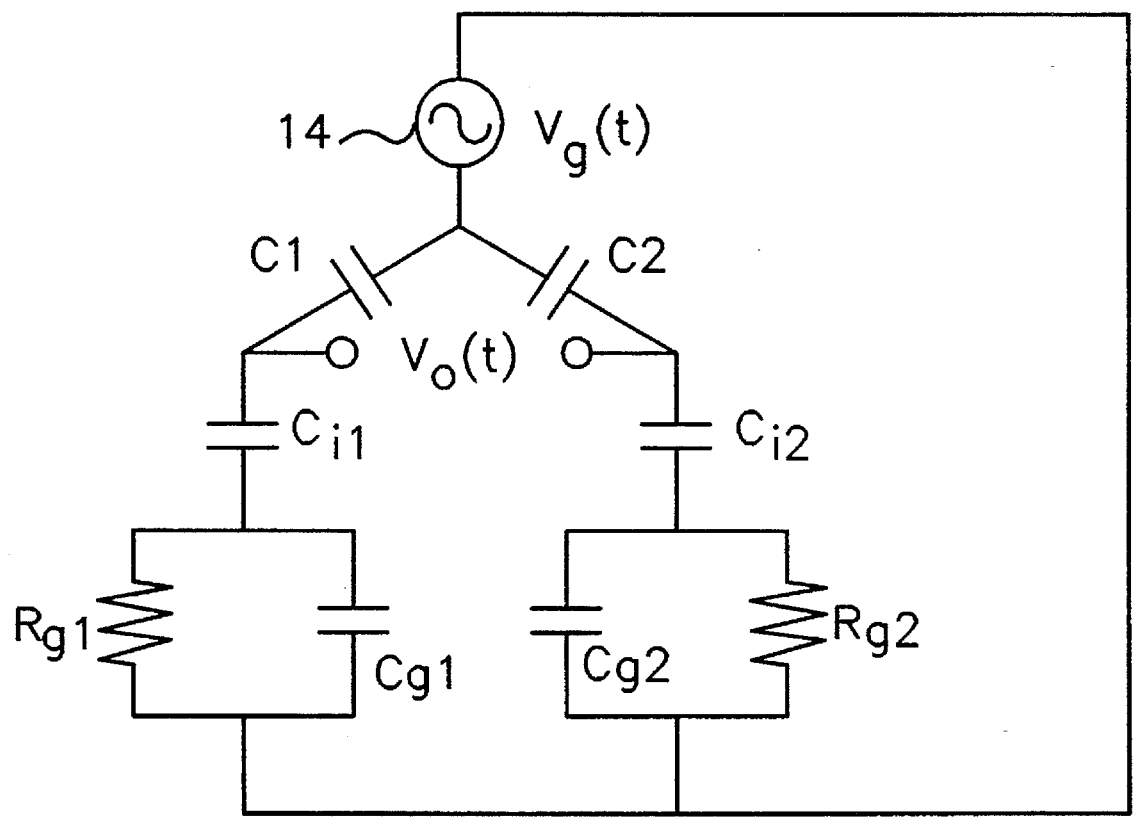
FIG. 5 is the simplified equivalent circuit of the circuit shown in FIG. 4.

From FIG. 5, it can be seen that the low frequency sinusoidal signal from signal generator 14 is injected into the ground via the series connected capacitors C1/$C_{i1}$ and C2/$C_{i2}$. The effect of a metal pipe buried directly beneath a sensor plate 10 will be to reduce the equivalent ground path resistance $R_{g1}$ or $R_{g2}$. For buried plastic or PVC pipe, two opposing effects become operative; an increase in $R_{g1}$ or $R_{g2}$ due to the nonconducting void as the injected ground current would traverse a longer path to flow around the curvature of the pipe; or, an increase in equivalent ground capacitance $C_{g1}$ or $C_{g2}$ due to perturbation of the electric field at the surface of the pipe. Thus, the effect of a pipe buried directly below an injector/sensor plate 10 is to unbalance the bridge. As previously stated, maximum output $V_o(t)_{max}$ occurs when one injector/sensor plate 10 is located directly over a pipe, and minimum output $V_o(t)_{min}$ occurs when the injector/sensor plates 10 straddle a pipe or when no pipe is present.

Figure 1:
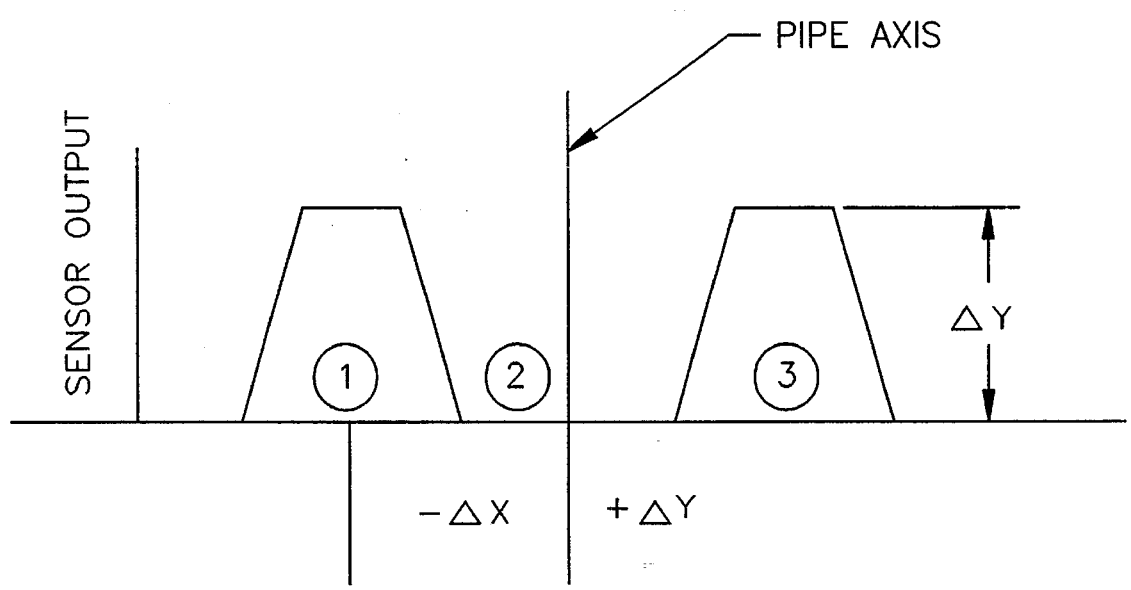
FIG. 1 is a graph of the differential sensor output vs. Lateral displacement from the axis of a buried pipe.
Figure 2:
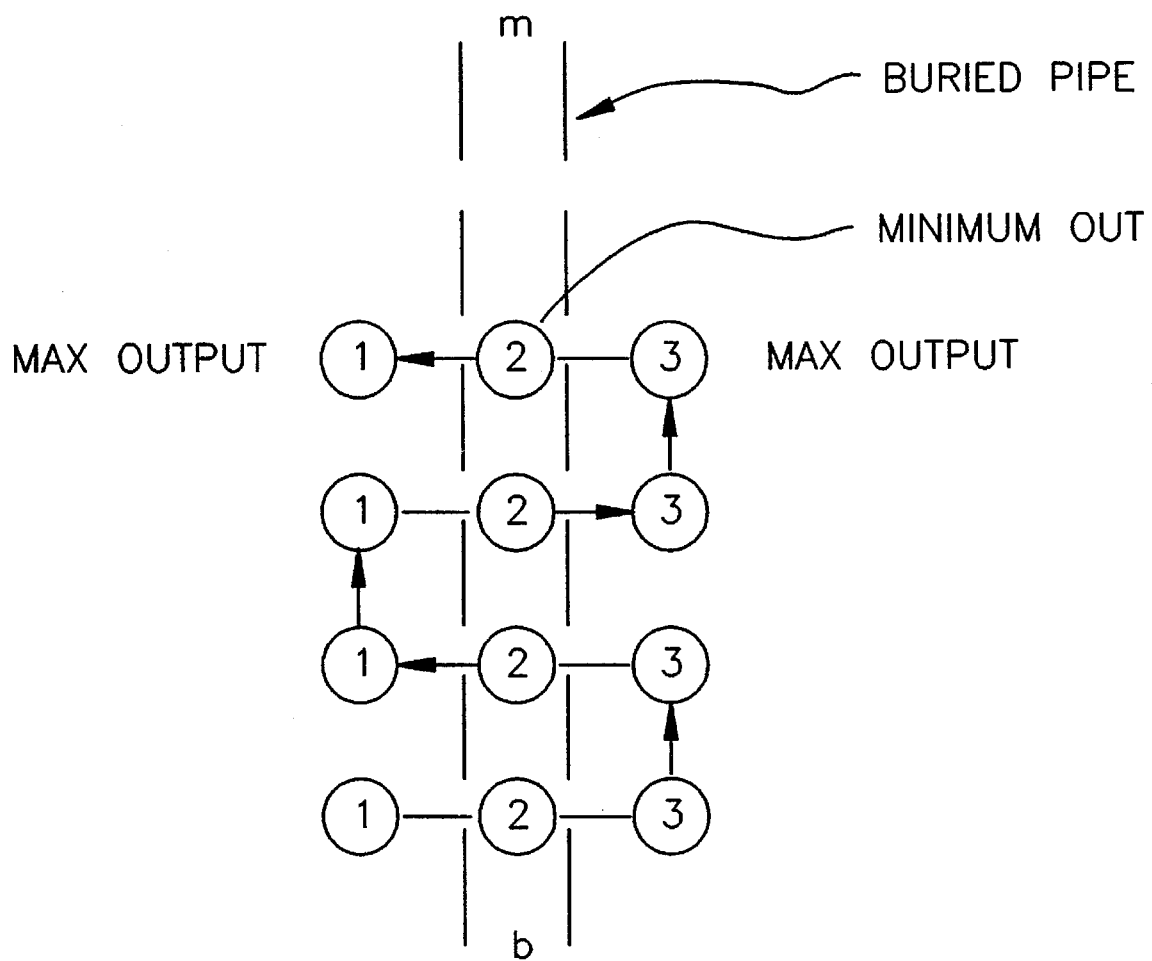
FIG. 2 depicts a hypothetical path traced by a capacitor plate array to follow a buried pipe.
Figure 6:
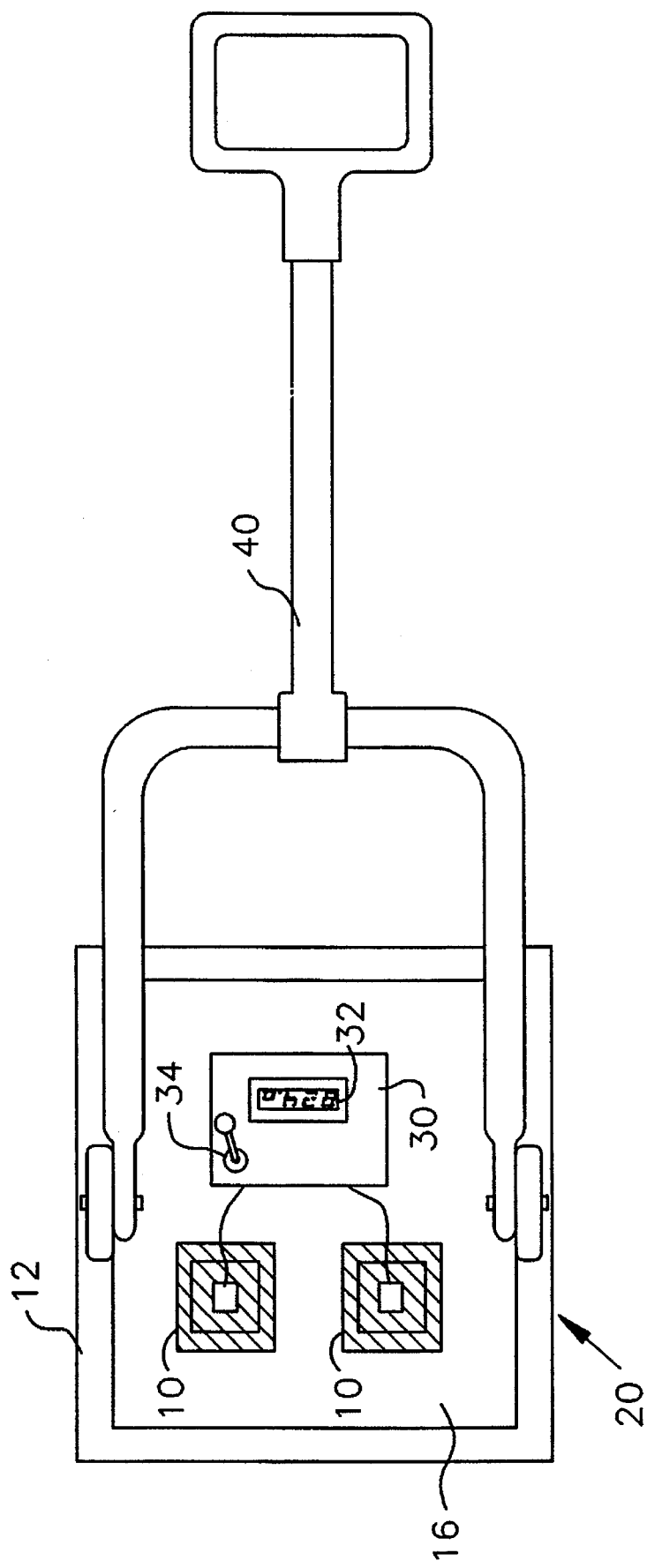
FIG. 6 is a depiction of a buried pipe locator assembly according to the teachings of the present invention.

The simplest embodiment of the present invention will comprise a capacitor plate array 20, an electronics assembly 30 having on/off switch 34 and digital readout 32, and a handle assembly 40 as shown in FIG. 6. The capacitor plate array 20 to which the electronics assembly 30 can be attached can be pushed along the ground via the handle assembly 40. It can be seen from FIG. 6 that the digital readout 32 can be viewed by an operator looking down on the capacitor plate array 20 as the handle assembly 40 is pushed so as to traverse a path similar to that shown in FIG. 2. The numeric readout on digital readout 32 would vary in accordance with that shown in FIG. 1 if a pipe is present.

Figure 7:
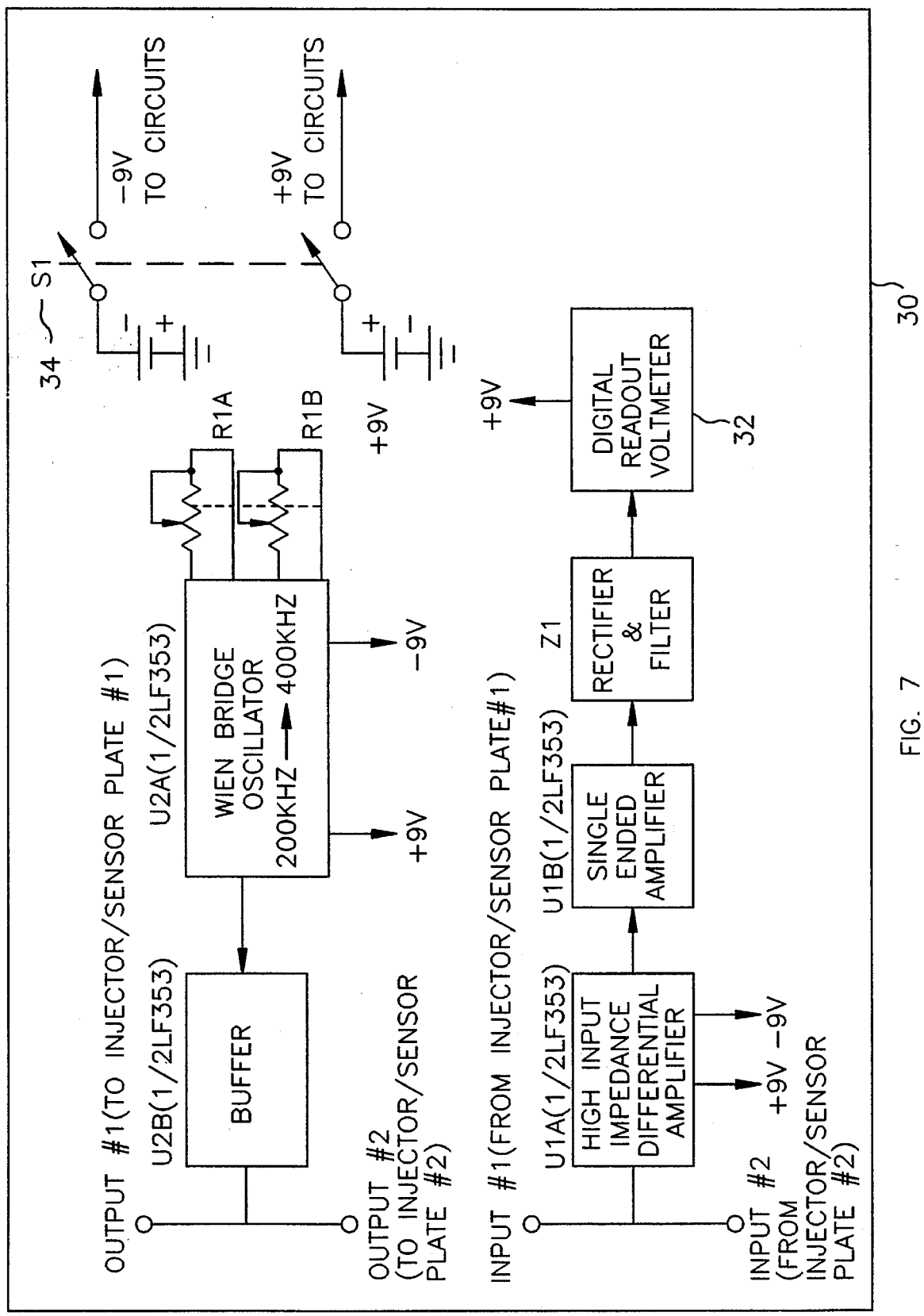
FIG. 7 is a block diagram of an electronics assembly used in a buried pipe locator according to the teachings of the present invention.

Electronic assembly 30 provides the low frequency sinusoidal signal $V_g(t)$ to drive the injector/sensor plates 10 of capacitor plate array 20, performs analog processing of the signals obtained from the injector/sensor plates 10, and provides a continuous 3½ digit readout of the processed signal on digital readout 32. Operation of the electronics assembly 30 is best understood by referring to the block diagram shown in FIG. 7. A suitable source of the low frequency sinusoidal signal $V_g(t)$ is a "Wien bridge" oscillator (U2A) and output buffer (U2B). The Wien bridge oscillator frequency is manually tunable from 200 KHZ to 400 KHZ via a dual variable resistor R1A/R1B. The Wein bridge oscillator is a well understood classical oscillator whose frequency determining elements are two resistor/capacitor combinations that form one side of a bridge circuit. Analog processing of the signals sampled from the injector/sensor plates 10 is performed by a high input impedance differential amplifier U1A, a single-ended amplifier U1B, and a rectifier filter network Z1. These circuits provide a D.C. signal whose amplitude is proportional to the voltage difference between the two injector/sensor plates 10. The digital readout 32 is a mini LCD D.C. voltmeter with a 3½ digit display.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

What is claimed is:

1. A device for locating buried objects comprising:

means for generating a low frequency sinusoidal signal;

means for injecting said low frequency sinusoidal signal into the ground through two spatially separated antenna means, each said antenna means comprising a flat plate antenna;

means for measuring and differentially combining the ground path impedance directly beneath each said antenna means;

a conductive plate connected to said means for generating a low frequency sinusoidal signal, said conductive plate being larger than said antenna means and having an insulator plate interposed between said antenna means and said conductive plate; and means for processing and displaying said differentially combined impedance measurements to provide an indication of a buried object.

2. The device of claim 1 wherein said means for measuring and differentially combining the ground path impedance directly beneath each said antenna means comprises and electronic assembly having a high input impedance differential amplifier and a single ended amplifier.

3. The device of claim 2 wherein said means for generating a low frequency sinusoidal signal comprises a Wien bridge oscillator.

4. The device of claim 3 wherein said oscillator is tuned between 200 and 400 KHZ.

5. The device of claim 4 wherein said device for locating buried objects further comprises a handle assembly to move said device around in proximity to the ground.

* * * * *